United States Patent
Kumar et al.

(10) Patent No.: US 12,030,538 B2
(45) Date of Patent: Jul. 9, 2024

(54) SYSTEM AND METHOD FOR PREVENTING A LOCKED AXLE

(71) Applicant: Transportation IP Holdings, LLC, Norwalk, CT (US)

(72) Inventors: Ajith Kuttannair Kumar, Erie, PA (US); Bret Worden, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 47 days.

(21) Appl. No.: 17/513,625

(22) Filed: Oct. 28, 2021

(65) Prior Publication Data
US 2022/0266879 A1  Aug. 25, 2022

Related U.S. Application Data

(60) Provisional application No. 63/152,157, filed on Feb. 22, 2021.

(51) Int. Cl.
*B61L 15/00* (2006.01)
*B61C 9/48* (2006.01)
(Continued)

(52) U.S. Cl.
CPC .......... *B61L 15/0081* (2013.01); *B61C 9/48* (2013.01); *B61L 15/0072* (2013.01);
(Continued)

(58) Field of Classification Search
CPC .... B61L 15/0081; B61L 15/0072; B61C 9/48; G01M 13/028; G01M 13/045;
(Continued)

(56) References Cited

U.S. PATENT DOCUMENTS

2007/0208841 A1  9/2007  Barone et al.
2015/0198578 A1*  7/2015  Worden ............... G01F 23/263
73/53.05
(Continued)

FOREIGN PATENT DOCUMENTS

CN  111521421 B  *  6/2022  ............. G01K 13/00
EP  3150978 A1  4/2017
WO  2005003698 A1  1/2005

OTHER PUBLICATIONS

Extended European Search Report for related European Patent Application No. 22156978.3 (10 pages).
(Continued)

*Primary Examiner* — Lisa M Caputo
*Assistant Examiner* — Cynthia L Davis
(74) *Attorney, Agent, or Firm* — K&L Gates LLP

(57) ABSTRACT

Methods are provided that may include determining one or more of a vibration characteristic or a fluid characteristic of one or more components of a vehicle and determining one or more expected characteristics for the one or more of the vibration characteristic or the fluid characteristic. The methods may also include determining whether the one or more of the vibration characteristic or the fluid characteristic deviates from the one or more expected respective characteristics, and implementing one or more responsive actions in response to determining that the one or more of the vibration characteristic or the fluid characteristic deviates from the one or more expected characteristics.

5 Claims, 8 Drawing Sheets

(51) Int. Cl.
  *G01M 13/028* (2019.01)
  *G01M 13/045* (2019.01)
  *G01M 17/10* (2006.01)

(52) U.S. Cl.
  CPC ........ *G01M 13/028* (2013.01); *G01M 13/045* (2013.01); *G01M 17/10* (2013.01)

(58) Field of Classification Search
  CPC . G01M 17/10; F16C 2233/00; F16C 2326/10; F16C 19/525; F16C 19/527; Y02T 30/00; G01H 1/00
  See application file for complete search history.

(56) References Cited

U.S. PATENT DOCUMENTS

| | | | |
|---|---|---|---|
| 2015/0369698 A1* | 12/2015 | Sakaguchi | G01M 13/04 702/56 |
| 2017/0089446 A1 | 3/2017 | Worden et al. | |
| 2017/0217458 A1* | 8/2017 | Shubs, Jr. | B61L 27/40 |
| 2017/0313332 A1* | 11/2017 | Paget | G06V 20/182 |
| 2019/0391049 A1 | 12/2019 | Jones | |
| 2020/0182684 A1 | 6/2020 | Yoskovitz et al. | |
| 2020/0309641 A1* | 10/2020 | Balboni | G06F 30/15 |

OTHER PUBLICATIONS

Office Action for corresponding JP Application No. 2022-020609 dated Aug. 28, 2023 (9 pages).
First Examination Report for corresponding AU Application No. 2022201179 dated May 25, 2023 (3 pages).
Third Examination Report for corresponding AU Application No. 2022201179 dated Dec. 7, 2023 (5 pages).

* cited by examiner

SYSTEM AND METHOD FOR PREVENTING A LOCKED AXLE

CROSS-REFERENCE

This application claims priority to U.S. Provisional Application No. 63/152,157 (filed 22 Feb. 2021), the entire disclosure of which is incorporated herein by reference.

BACKGROUND

Technical Field

The subject matter described relates to systems and methods related to a control system for early detection of a drive train failure of a vehicle.

Discussion of Art

Vehicle systems, such as rail vehicles are utilized for both transportation of passengers and/or transportation of cargo. The rail vehicles typically are vehicle systems that include numerous vehicles that may be mechanically, logically, virtually, etc. coupled to one another to travel along a rail. The vehicle within the vehicle system includes its own set of wheels and optionally corresponding axles. Some vehicles, such as locomotives, include traction motors to provide motive force to the axles, while other vehicles merely are pushed or pulled along the rail with the wheels rotating accordingly. Such rail vehicles travel along numerous tracks of a rail system, with multiple rail vehicles utilizing the rail system at any one time.

When a rail vehicle stalls on a main line of a rail system, undue delays result. Consequently the rail vehicle experiences a loss of revenue while simultaneously disrupting traffic of the rail system. Clearing the stalled rail vehicle requires much effort and expense. For example, when a rail vehicle stalls because of a locked axle, either the locked axle has to be replaced, the pinion has to be cut, or other temporary corrections must be done on the track. Sometimes stalls can occur in remote and difficult to get to places with no available equipment for making repair, causing additional difficulties.

BRIEF DESCRIPTION

In one or more embodiments, a method is provided that may include determining one or more of a vibration characteristic or a fluid characteristic of one or more components of a vehicle, and determining one or more expected characteristics for the one or more of the vibration characteristic or the fluid characteristic. The method may also include determining whether the one or more of the vibration characteristic or the fluid characteristic deviates from the one or more expected respective characteristics, and implementing one or more responsive actions in response to determining that the one or more of the vibration characteristic or the fluid characteristic deviates from the one or more expected characteristics.

In one or more embodiments, a method is provided that may include determining one or more of a temperature, a vibration signature, or a fluid lubricant amount for a first axle of a vehicle, and determining the one or more of the temperature, the vibration signature, or the fluid lubricant amount for at least a second axle of the vehicle. The method may also include comparing the one or more of the temperature, the vibration signature, or the fluid lubricant amount that is determined for the first axle with the one or more of the temperature, the vibration, or the fluid lubricant amount that is determined for the at least the second axle, and determining a health of the first axle based on comparing the one or more of the temperature, the vibration signature, or the fluid lubricant amount that is determined for the first axle with the one or more of the temperature, the vibration signature, or the fluid lubricant amount that is determined for the at least the second axle.

In one or more embodiments, a system is provided that may include one or more sensors that may measure one or more of a vibration characteristic or a fluid lubrication amount of one or more components of a vehicle. The system may also include one or more processors that may determine one or more expected characteristics for the one or more of the vibration characteristic or the fluid lubrication amount. The one or more expected characteristics may be at least partially based on an ambient condition. The one or more processors may determine whether the one or more of the vibration characteristic or the lubrication characteristic deviates from the one or more expected characteristics. The one or more processors may implement one or more responsive actions in response to determining that the one or more of the vibration characteristic or the lubrication characteristic deviates from the one or more expected characteristics.

In one or more embodiments, a method is provided that may include determining one or more of a vibration characteristic or a fluid lubrication amount of one or more components of a vehicle. The method may also include determining one or more expected characteristics for the one or more of the vibration characteristic or the fluid lubrication amount. The one or more expected characteristics may at least partially be based on an ambient condition. The method may also include determining whether the one or more of the vibration characteristic or the lubrication characteristic deviates from the one or more expected characteristics, and determining health scores for each of plural axles of the vehicle based on deviation between the one or more of the vibration characteristic or the lubrication characteristic and the one or more expected characteristics. The method may also include selecting stopping movement of the vehicle, slowing the movement of the vehicle, completing a current trip of the vehicle, and preventing a subsequent trip of the vehicle until the vehicle is repaired, or scheduling service of the one or more components of the vehicle at a subsequent, previously scheduled maintenance of the vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a system and method for early detection of a drive train failure of a rail vehicle. Based on the detection, and likelihood of a failure in a given period, actions are undertaken to reduce the probability, or prevent the drive train failure. By making the determination and taking actions to mitigate the drive train failure, nuisances resulting from a stalled vehicle system are mitigated.

Figure 1:
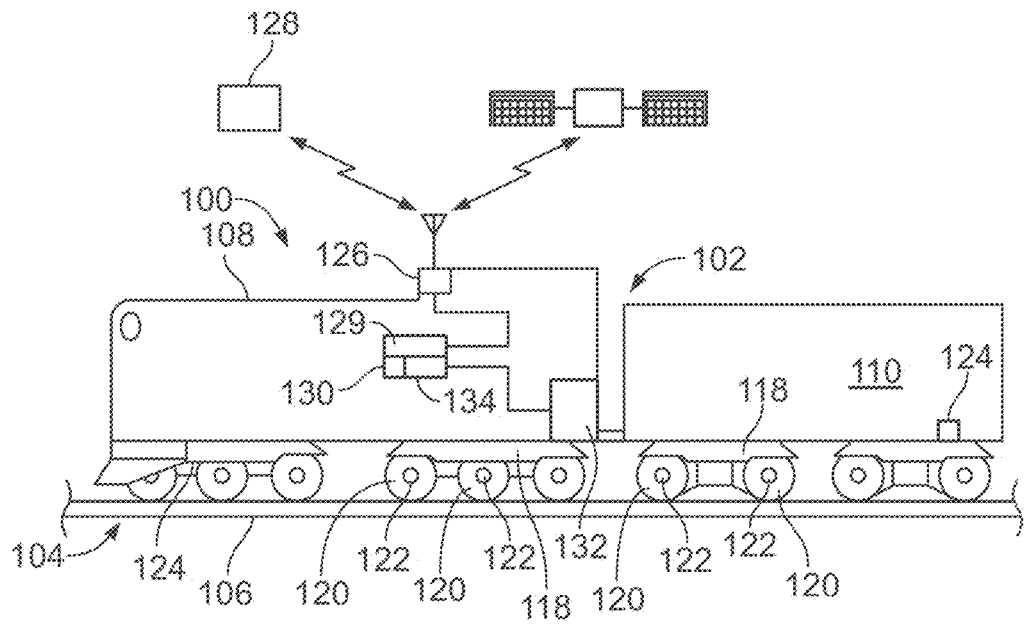
FIG. 1 illustrates a block schematic diagram of a vehicle system.

FIG. 1 illustrates a schematic diagram of one example of a vehicle system 100 that includes a control system 102. The vehicle system may travel along a route 104 on a trip from a starting or departure location to a destination or arrival location. The vehicle system includes at least one propulsion-generating vehicle 108 and, optionally, at least one non-propulsion-generating vehicle 110 that are mechanically interconnected to one another to travel together along the route. Alternatively, the vehicle system may be formed of only a single propulsion-generating vehicle or only two or more propulsion-generating vehicles.

The propulsion-generating vehicle may generate tractive efforts to propel (for example, pull or push) the vehicle system along routes. The propulsion-generating vehicle includes a propulsion subsystem, such as an engine, one or more traction motors, and/or the like, that operate to generate tractive effort to propel the vehicle system. The propulsion-generating vehicle also includes a braking system that generates braking effort to slow or stop movement of the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In yet another embodiment, the vehicles in the vehicle system are logically or virtually coupled together, but not mechanically coupled together.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc.

The control system may further include a wireless communication system 126 that allows wireless communications between vehicles in the vehicle system and/or with remote locations, such as the remote (e.g., dispatch) location 128. The communication system may include a receiver and a transmitter, or a transceiver that performs both receiving and transmitting functions. The communication system may also include an antenna and associated circuitry.

The control system further includes a controller 129 that includes a trip characterization element 130 that in one example may include characterization circuitry in communication with one or more processors. The trip characterization element may provide information about the trip of the vehicle system along the route. The trip information may include route characteristics, designated locations, designated stopping locations, schedule times, meet-up events, directions along the route, and the like.

In an embodiment, the controller may also include a vehicle characterization element 134. The vehicle characterization element may provide information about the make-up of the vehicle system, such as the type of non-propulsion-generating vehicles (for example, the manufacturer, the product number, the materials, etc.), the number of non-propulsion-generating vehicles, the weight of non-propulsion-generating vehicles, whether the non-propulsion-generating vehicles are consistent (meaning relatively identical in weight and distribution throughout the length of the vehicle system) or inconsistent, the type and weight of cargo, the total weight of the vehicle system, the number of propulsion-generating vehicles, the position and arrangement of propulsion-generating vehicles relative to the non-propulsion-generating vehicles, the type of propulsion-generating vehicles (including the manufacturer, the product number, power output capabilities, available notch settings, fuel usage rates, etc.), and the like.

The vehicle characterization element may be a database stored in an electronic storage device, or memory. The information in the vehicle characterization element may be input using an input/output (I/O) device (referred to as a user interface device) by an operator, may be automatically uploaded, or may be received remotely via the communication system. The source for at least some of the information in the vehicle characterization element may be a vehicle manifest, a log, or the like.

Figure 2:
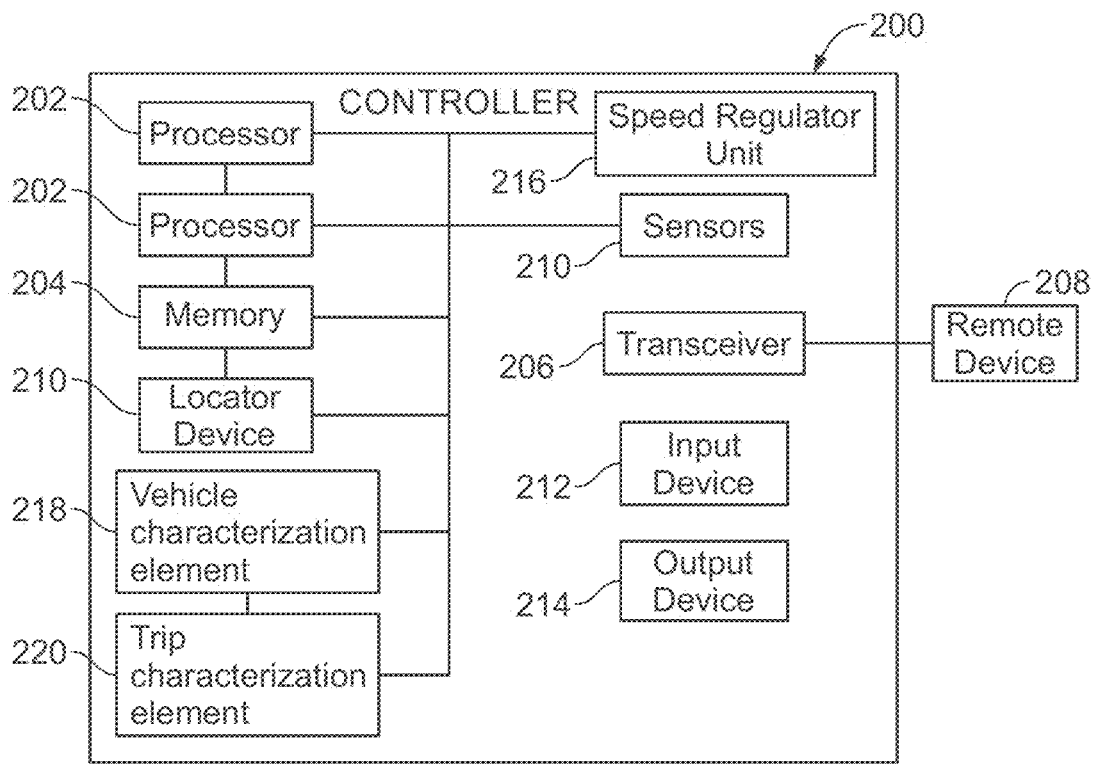
FIG. 2 illustrates block schematic diagram of a control system.

FIG. 2 provides a schematic illustration of a controller 200 that may control operation of a propulsion-generating vehicle. In one example, the controller represents the controller in FIG. 1. The controller may be a device that includes one or more processors 202 (microprocessors, integrated circuits, field programmable gate arrays, etc.). The controller optionally may also include a controller memory 204, which may be an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The memory may be utilized to store information related to vehicle parameters, route characteristics, trip parameters, or the like. Vehicle parameters may include vehicle weight, wheel diameter, tachometer readings, throttle settings, brake settings, speeds, brake settings, accelerations, etc. Route characteristics may include route grade, route weather, route curvature, etc. Trip parameters may include destination, speed limits for areas, traffic congestion, break locations, tunnel locations, or the like.

The controller may also include a transceiver 206 that may communicate with a remote device 208. The transceiver may be a single unit or be a separate receiver and transmitter. In one example, the transceiver may only transmit signals. The remote device 208 may be a dispatch controller, a controller of another vehicle, a second controller coupled to the vehicle system, a controller within a wayside device, or the like.

The controller may also include or communicate with one or more sensors 210 coupled to the vehicle system to detect vehicle parameters, route characteristics, trip parameters, or the like. In one embodiment, at least one sensor is a temperature sensor that measures the temperature of a component of the vehicle system. For example, the temperature sensor may be an axle bearing temperature sensor that may measure either a pinion end (PE) bearing or other bearing, an oil temperature sensor that measures the temperature of oil utilized in association with the axles and axle bearings, or the temperature of oil which may or may not be utilized in association with an ambient, engine, a motor winding temperature sensor, or the like. In another embodiment, the at least one sensor may be a vibration sensor related to a component of the vehicle system. For example, the vibration sensor may be a bearing vibration sensor, gear vibration sensor, gear case vibration sensor, gear sound sensor, a vibration sensor that detects accelerations of a wheel caused by flat spots, etc. In particular, the vibration sensor may detect amplitudes, frequency, amplitudes of specific frequency ranges of interest, etc. Alternatively, the at least one sensor may be an oil fluid level sensor for an engine or gear case, a sensor that detects ambient conditions of the vehicle system or a component of the vehicle system, vehicle operation sensors including speed sensors, or the like. Combinations of each of these sensors may also be provided. In particular, each sensor may detect or monitor operations to obtain data that may be utilized for early detection of a drive train failure. In one example, determinations regarding whether a locked axle is more or less likely to occur for a specific axle is made.

The controller may also include an input device 212 and an output device 214. Specifically, the input device may be an interface between an operator and the one or more processors. The input device may include a display or touch screen, input buttons, ports for receiving memory devices, etc. In this manner, an operator may manually provide parameters into the controller, including vehicle parameters, route characteristics, trip parameters, etc. Similarly, the output device may present information and data to an operator, or provide prompts for information and data. The output device may similarly be a display or touch screen. In this manner, a display or touch screen may be an input device and an output device. The controller may also receive inputs from both a vehicle characterization element 218 and a trip characterization element 220.

Figure 3:
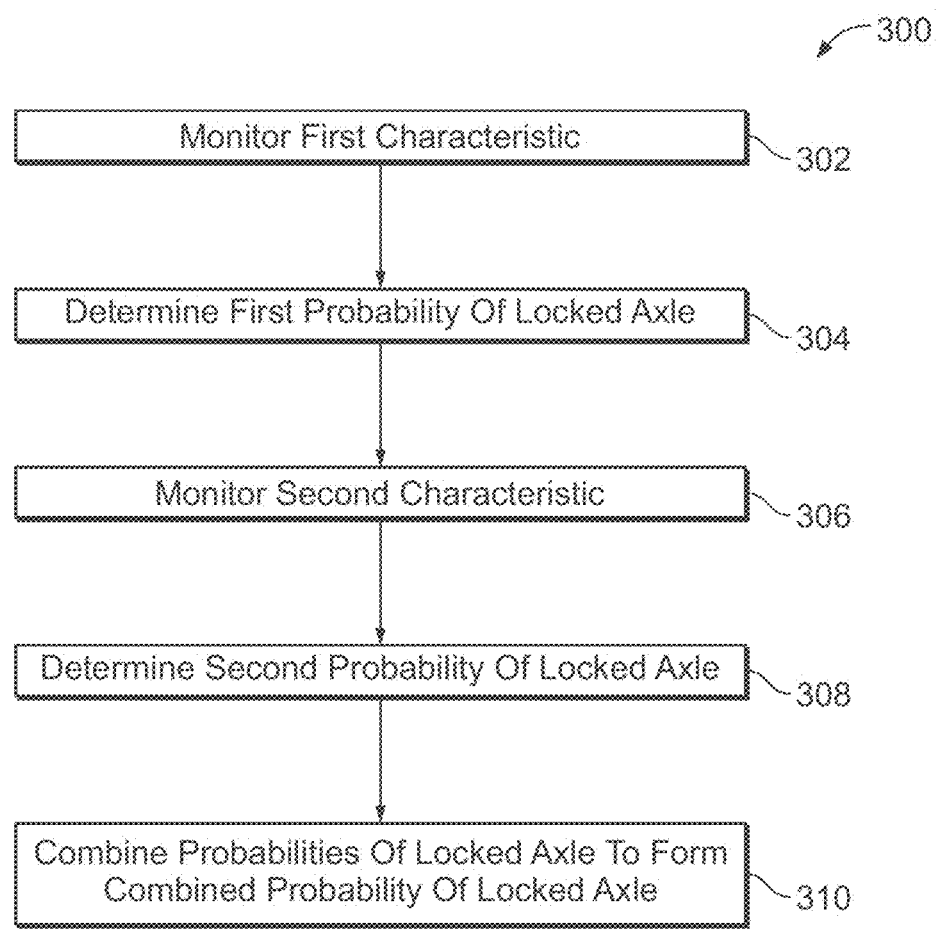
FIG. 3 illustrates a flow block diagram of a method to determine a combined probability.

FIG. 3 illustrates a method 300 of determining a combined probability that a locked axle will occur over a determined period. While other conditions may be determined in other example embodiments, for the example of FIG. 3, a locked axle is determined. The methodology of FIG. 3 can be used as a basis for the methodology of FIG. 7 (that may determine a health score and take active action to prevent stoppage of vehicle system as a result of the condition determined in FIG. 3). Specifically, by utilizing the strategy and methodology of FIG. 3, the health score may ultimately be determined for each axle within a vehicle system based on differences between expected vehicle characteristics compared to measured vehicle characteristics.

At step 302, a first characteristic is monitored. The first characteristic may be a vibration characteristic, a fluid characteristic, a temperature characteristic, lubrication oil contaminant characteristic, or the like. The first characteristic may be monitored by one or more sensors. In example embodiments, the one or more sensors may include thermometers, sound sensors, optical sensors, infrared sensors, vibration sensors, accelerometers, gearcase sensors, axle bearing temperature sensors, oil temperature sensors, motor winding temperature sensors, etc. By monitoring the first characteristic with the sensors, reading, data, information, etc. are obtained related to the first characteristic. In one example, the vibration characteristic is a vibration signature from a vibration sensor, the fluid characteristic is a fluid lubricant contaminant amount, and the temperature characteristic is a temperature.

At step 304, a first probability that a locked axle will occur in a given period is determined. The given period may be a duration of time, such as three (3) days. In another example, the period is related to a number of miles (or kilometers). In particular, by monitoring the first characteristic, the probability regarding when a locked axle will occur can be determined.

Figure 4B:
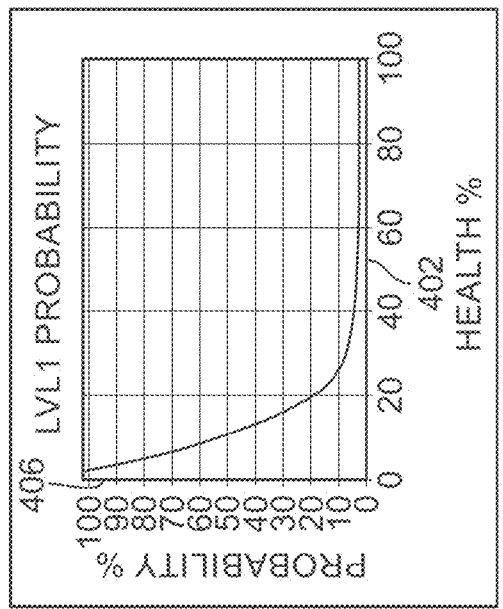
FIG. 4B illustrates a graph of a probability of a locked axle.
Figure 4A:
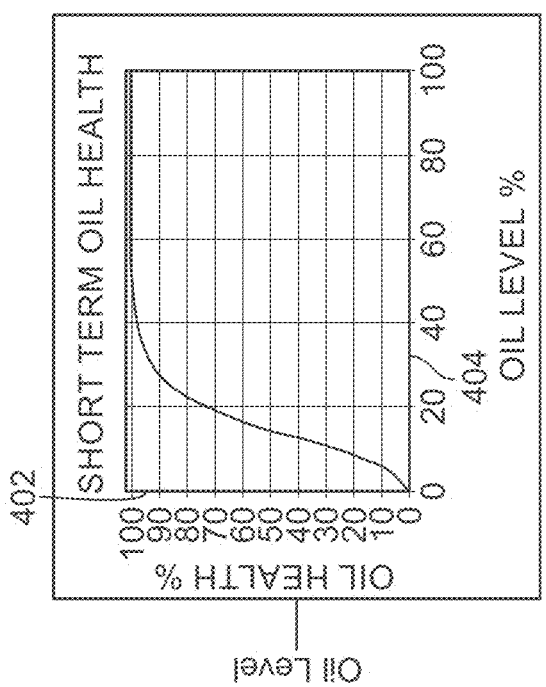
FIG. 4A illustrates a graph of short term oil health.

In one example embodiment, the oil level within a gear case is a fluid characteristic that is monitored. FIG. 4A is a graph illustrating short term oil health 402 as a function of oil level 404. In particular, as the percentage of oil decreases, so does the oil health. In this manner, a first probability based on the first characteristic may be determined. FIG. 4B illustrates the first probability of a locked axle based on oil level 406 in a determined period of time, such as one week based on the short-term oil health. Similarly, the first probability may be a determined distance of travel, such as within a hundred (100) miles. As illustrated by the graph, as oil health decreases, the first probability of a locked axle increases.

At step 306, a second characteristic is monitored. The second characteristic may be a vibration characteristic, a fluid characteristic, a temperature characteristic, lubrication oil contaminant characteristic or the like. The characteristic may be monitored by one or more sensors. In example embodiments the one or more sensors may include thermometers, sound sensors, optical sensors, infrared sensors, vibration sensors, accelerometers, gearcase sensors, axle bearing temperature sensors, oil temperature sensors, motor winding temperature sensors, etc. By monitoring the second characteristic with the sensors, reading, data, information, etc. are obtained related to the second characteristic. In one example, the vibration characteristic is a vibration signature from a vibration sensor, the fluid characteristic is a fluid lubricant amount, and the temperature characteristic is a temperature.

Figure 5B:
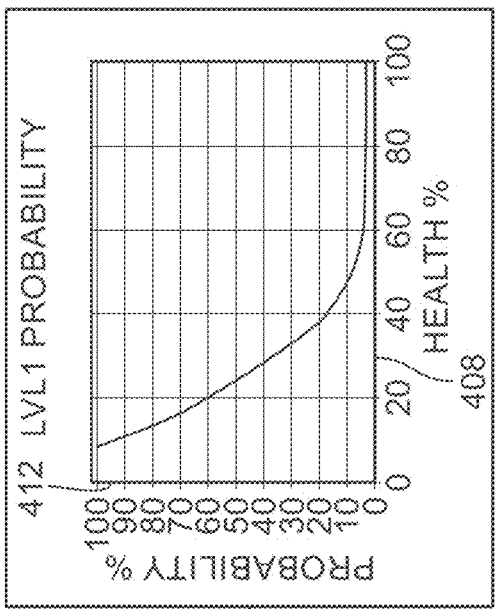
FIG. 5B illustrates a graph of a probability of a locked axle.
Figure 5A:
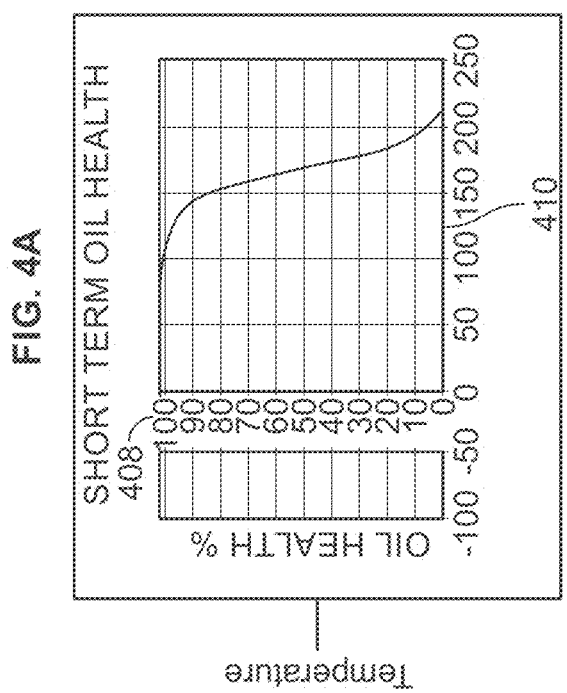
FIG. 5A illustrates a graph of short term oil health.

At step 308, a second probability that a locked axle will occur in a given period is determined. The given period may be a duration of time, such as three (3) days. In another example, the period is related to a number of miles (or kilometers). In particular, by monitoring the second characteristic, the second probability regarding when a locked axle will occur can be determined. FIG. 5A illustrates a graph of short-term oil health 408 as a function of oil temperature 410. As the temperature of the oil within the gear case increases, the short-term oil health decreases. FIG. 5B illustrates the second probability of a locked axle based on oil temperature 412 in a determined period of time, such as one week based on the short-term oil health. Similarly, the second probability may be a determined distance of travel, such as within a hundred (100) miles. As illustrated by the graph, as oil temperature increase, the second probability of a locked axle similarly increases.

Figure 6:
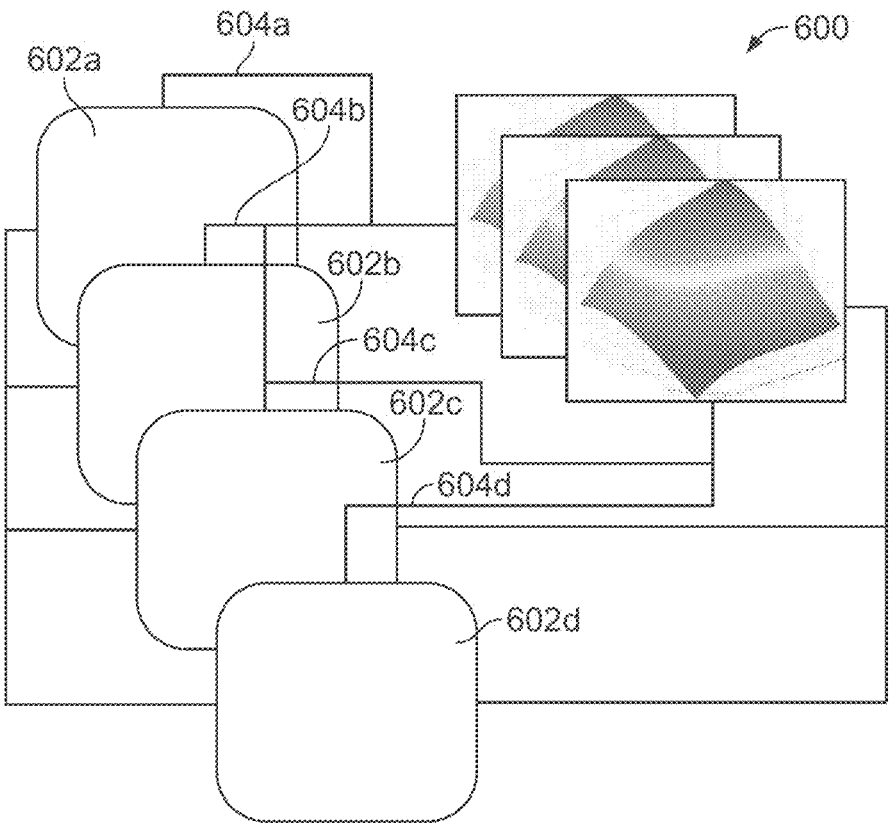
FIG. 6 illustrates a schematic block diagram of a system.

At step 310, the first and second probabilities are combined to form a combined probability that a locked axle will occur in a given period. Further, additional probabilities may also be included to determine the combined probability that a locked axle will occur in a given period. FIG. 6 illustrates a schematic block diagram of a system 600 for determining the probability of a locking axle. In this example, inputs 602A, 602B, 602C, and 602D are provided as a result of monitoring for characteristics. From the monitored inputs, first probability 604A, second probability 604B, third probability 604C, and fourth probability 604D are all determined based on the individual inputs. In one example, the first probability 604A is a probability of a locked axle based on oil level. In one embodiment, the probability of a locked axle based on oil level is determined as provided by the graphs of FIGS. 4A and 4B. In another embodiment, the second probability is a probability of a locked axle based on oil temperature. In one example, the probability of a locked axle based on oil temperature is determined as provided by the graphs FIGS. 5A and 5B. In another example, the third probability is a probability of a locked axle based on gear case vibration, while the fourth probability is a probability of a locked axle based on a wheel defect. The first, second, third, and fourth probabilities are then utilized to determine a combined probability of a locked axle for a period. The combined probability of a locked axle may be determined by averaging the probabilities, giving more or less weight to certain probabilities, choosing the highest probability, or the like. By utilizing a combination of variables, accuracy is improved, and locked axles may be prevented through maintenance and other preventative measures.

Figure 7:
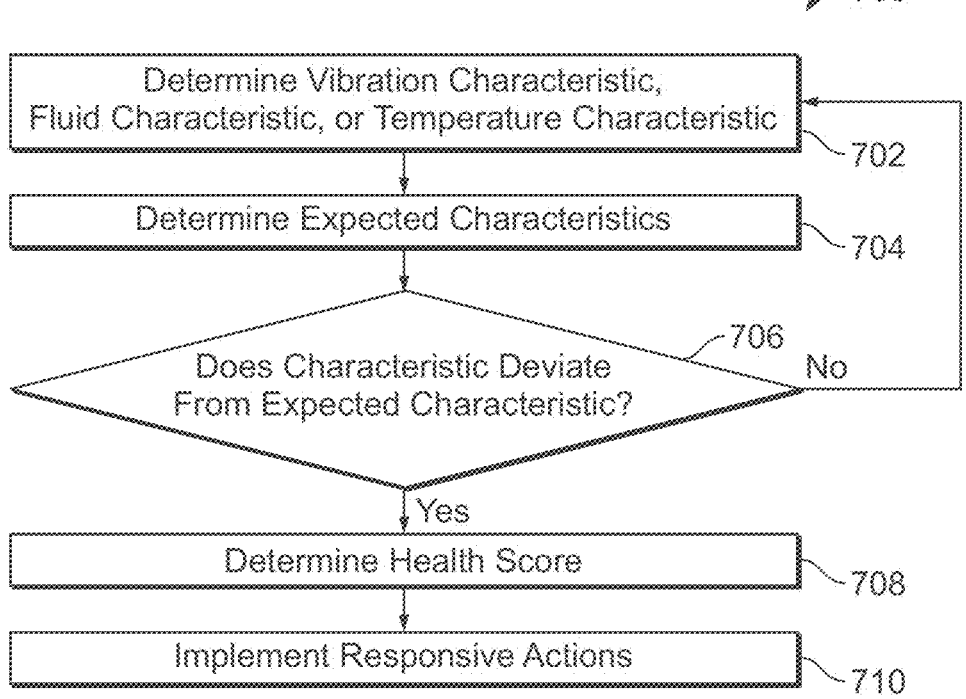
FIG. 7 illustrates a flow block diagram of a method of determining a locked axle for a vehicle system.

FIG. 7 illustrates a method 700 for determining a likelihood of a drive train failure of a rail vehicle for a vehicle system as a result of a locked axle. In one example, the vehicle system is the vehicle system of FIG. 1. In another example, the method is implemented by the controller of FIG. 2. In one embodiment the vehicle system is a rail vehicle system. In other embodiments, the vehicle system is one of off-road vehicle(s), trolley(s), a fleet of aircraft, a fleet of marine vessels, or the like.

At step 702, one or more of a vibration characteristic, a fluid characteristic, or temperature characteristic of one or more components of a vehicle are determined. In an example, the determination may be made by a controller. In one example the vehicle is part of a vehicle system. The vibration characteristic may be any reading, data, information, signal, current, slip, amplitude, frequency, vibration amplitudes of specific frequency ranges of interest, etc. related or associated with vibration. The reading, data, information, signal, current, slip, amplitude, frequency, vibration amplitudes of specific frequency ranges of interest, etc. may be related or associated with vibration if it provides the vibration of any component of the vehicle or may be utilized to obtain the vibration of any component of the vehicle. The vibration characteristic may be provided by the reading, data, information, signal, current, slip, capacitance, amplitude, frequency, vibration amplitudes of specific frequency ranges of interest, etc. The vibration characteristic may be obtained utilizing an algorithm, mathematical equation, mathematic model, a function, look up table, decision tree, etc. The vibration characteristic determined may include one or more of a bearing vibration of one or more bearings of an axle of the vehicle, a gear vibration of one or more gears of the vehicle, a gear transmitted vibration generated by the one or more gears of the vehicle, an air transmitted vibration, a structure transmitted vibration, a case vibration of a gear case of the vehicle, an acceleration of one or more wheels of the vehicle, a vibration signature, or the like.

The temperature characteristic may be any reading, data, information, signal, current, slip, capacitance, etc. related to or associated with temperature. The reading, data, information, signal, current, slip, capacitance, etc. may be related or associated with temperature if it provides the temperature of any component of the vehicle. The temperature characteristic may be obtained utilizing an algorithm, mathematical equation, mathematic model, a function, look up table, decision tree, etc. The temperature characteristic determined may include one or more of a temperature, a fluid temperature, lubricant temperature, axle bearing temperature including PE bearing temperature and CE bearing temperature, including of bearing elements, races, tubes, or the like, motor winding temperature, etc.

In example embodiments, a characteristic may be two or more of a vibration characteristic, fluid characteristic, and temperature characteristic. For example, the temperature of fluid such as oil within a gear case may be both a fluid characteristic and a temperature characteristic.

Similarly, the fluid characteristic may be any reading, data, information, signal, current, slip, capacitance, etc. related or associated with a fluid. The reading, data, information, signal, current, slip, capacitance, etc. may be related or associated with the fluid if it provides a characteristic of a fluid of the vehicle or may be utilized to obtain the characteristic a fluid of the vehicle. The fluid characteristic may be provided by the reading, data, information, signal, current, slip, capacitance, etc. The fluid characteristic may be obtained utilizing an algorithm, mathematical equation, mathematic model, a function, look up table, decision tree, etc. The fluid characteristic determined may include one or more of a fluid amount, an axle bearing temperature of one or more bearings of an axle of the vehicle, a motor bearing temperature of one or more traction motor bearings, a combination bearing temperature of one or more combination bearings, a journal bearing temperature of one or more journal bearings, a fluid temperature of a lubricant in one or more of a gear case or an engine of the vehicle, a motor winding temperature of one or more conductive windings of a motor in the vehicle, lubricant or fluid levels, or the like.

At step 704, one or more expected characteristics for the one or more of the vibration characteristic, the fluid characteristic, or temperature characteristic is determined. Expected characteristics are characteristics based on calculations or determinations as opposed to an actual characteristic that may be directly measured or determined based on direct measurements. Specifically, based on forces acting on a vehicle, vehicle component, etc. the calculations or determinations may be made regarding each vibration characteristic, fluid characteristic, and temperature characteristic if no malfunctioning of components is occurring. For example, if a rail vehicle has traveled one hundred (100) miles at an average vehicle speed of fifty (50) mph, at an average axle power of 500 HP, a calculation may be made regarding the expected lubrication fluid temperature for an axle gearcase.

Meanwhile, the actual fluid temperature may also be determined directly by a sensor immersed in the oil. In this manner, the calculated fluid temperature from the variables such as travel distance, vehicle speed, etc. is an expected fluid characteristic, while the fluid characteristic measured directly by the temperature sensor is not an expected fluid characteristic. Specifically, in one example, the vehicle includes plural axles, and the one or more of the vibration characteristic, the fluid characteristic such as lube level, or temperature characteristic is determined for a first axle of the axles, and the one or more expected vibration characteristic, fluid characteristic, or temperature characteristic are determined based at least in part on operation of a set of the axles that does not include the first axle. In particular, the expected vibration characteristic and fluid characteristic do not have to utilize direct measurements of the axles.

In one example, expected characteristics may be determined utilizing information from a remote location. In particular, in rail vehicle embodiments, positive vehicle controllers (PVCs) may be utilized to restrict and control movement of the rail vehicle on a rail system in relation to the other rail vehicles utilizing the rail system. Such information that is continuously obtained may be utilized to make determinations and calculations related to the expected characteristics. Additionally, a controller with trip optimizer software may be utilized that continuously obtains data, information, or the like related to a rail vehicle. Specifically, the trip optimizer software functions to meet objectives related to any given individual trip. For example, a certain trip may be desired to be made in a certain amount of time, and with a certain amount of pollution created. The trip optimizer software then operates the rail vehicle to operate in a manner that meets these objectives. Still, to accomplish such optimization, information, data, or the like is continuously gathered. Such information, data, etc. may be utilized to make determinations and calculations related to the expected characteristics.

In example embodiments, the one or more expected characteristics may at least partially be based on an ambient condition. Such ambient condition may be utilized in combination with direct measurements related to the expected characteristic, or without utilizing direct measurements of the expected characteristic. The ambient condition can include one or more of a rotational speed of one or more wheels of the vehicle, an ambient temperature, an ambient sound, a route characteristic of a route on which the vehicle is moving, a vehicle characteristic of the vehicle, an axel torque applied to one or more axles of the vehicle, one or more of a health or irregularity of the route or the rails, a presence of one or more gaps in the route, a curvature of the route, a position of the vehicle on the route, or a misalignment in the route as the route characteristic, a weight of the vehicle, vehicle speed, a size of a wheel of the vehicle, an estimated dynamic axle weight as the vehicle characteristic, or the like.

In another example, the one or more expected characteristics for the one or more of the vibration characteristic, fluid lubrication, or temperature lubrication amount also may be based on operation of the vehicle. Specifically, the one or more expected characteristics may be based on the operation of the vehicle that includes one or more of a vehicle speed, an axle torque exerted on an axle of the vehicle, an ambient temperature, one or more characteristics of a route on which the vehicle is moving, one or more characteristics of the vehicle, etc.

At step 706, one or more of the vibration characteristic, the fluid characteristic or temperature characteristic is determined to have deviated from the one or more expected respective characteristics. In one example, the vibration characteristic, fluid characteristic, or temperature characteristic may be compared to the expected respective characteristics. In other examples, a mathematical function, mathematical model, look up table, decision tree, function, algorithm, etc. may be utilized to determine the deviation. In other examples, a tolerance may be determined such that if a difference between the vibration characteristic, fluid characteristic, or temperature characteristic is not greater than the tolerance, a determination of a deviation is not provided. In another embodiment, the tolerance may be based on a determined amount. For example, if a fluid characteristic is an oil temperature of the oil lubricating the bearings in a bearing assembly, a determined tolerance may be five (5) degrees Fahrenheit (or approximately two (2) degrees Celsius). In this manner, if the fluid characteristic of the oil is 300 degrees Fahrenheit (150 degrees Celsius) when the expected fluid characteristic of the oil is 297 degrees Fahrenheit (149 degrees Celsius), the fluid characteristic is determined to have not deviated from the expected respective oil temperature. Whereas if the expected fluid characteristic of the oil is 290 degrees Fahrenheit (143 degrees Celsius), the fluid characteristic has deviated from the expected fluid characteristic. In other embodiments, instead of a determined amount, a percent difference may be utilized. In this manner, as the vibration characteristics, fluid characteristics, or temperature characteristics increase or decrease, the range of the tolerance may similarly increase or decrease. In yet another example, the fluid characteristic may indicate the amount of lubrication oil contaminants. Such contaminants can include water, soot, dirt, metallic particles, etc. Such characteristics can indicate the need for fluid replacement and/or repair of seals or gaskets. Thus, the amount of contaminants being outside of a determined range may indicate such needs.

If at step 706, a determination is made that a deviation between the vibration characteristic, fluid characteristic, or temperature characteristic has not occurred, the vibration characteristic, fluid characteristic, or temperature characteristic continue to be determined at 704. If a determination is made that a deviation between the vibration characteristic, fluid characteristic, or temperature characteristic has occurred, then at 708 health scores for each of plural axles of the vehicle are determined based on the deviation between the one or more of the vibration characteristic, the lubrication characteristic, or temperature characteristic and the one or more expected characteristics. In one example, the method of FIG. 3 is utilized to determine the health scored. Specifically, determinations may be made related to the health of an axle.

Vibration characteristics, fluid characteristics, and temperature characteristics may be utilized to determine health of an axle, and a probability that drive train failure may occur. For example, when a reduced oil level is provided in a gear case, an increased probability of a locked axle may be provided. When the oil temperature in the gear case is increased, the probability of a locked axle may increase. When a gear case vibration increases, an increased probability of locked axle may be provided. When an axle bearing temperature, or bearing race temperature are increased, an increased probability of a locked axle may be provided. A gear or wheel defect may also result in an increased probability of a locked axle. In yet another example, motor winding temperature may be an indication of an increase in a probability of a locked axle.

In many of the instances and examples provided, while temperatures or vibrations are expected to increase during operation, based on the forces acting on the vehicle system, along with historical information related to such characteristics, a greater than expected increase is an indication that the probability of a locked axle has increased. Thus, by monitoring a single of these characteristics, a probability can be determined related to the likelihood of a locked axle. In some embodiments, more than one probability may be utilized to determining an overall probability of a locked axle. For example, both a gear case temperature and gear case fluid level may be monitored, and probabilities of a locked axle determined for both. In one example the probabilities may be averaged to determine an overall probability of a locked axle. In another embodiment, the determined probabilities may be weighted based on determined factors, severity of the deviation from an expected value, or the like. In yet another embodiment, an algorithm may be utilized to make such probability determinations. In all, based on the vibration characteristics, the fluid characteristics, and/or temperature characteristics the health of an axle may be determined based on the probabilities determined. Based on the probabilities, a heath score may be provided. The health score may be determined by a look up table, decision tree, algorithm, mathematical function, mathematical model, or the like.

At step 710, responsive actions may be implemented based on the health score. Specifically, when the health score indicates that a high probability exists that a locked axle may occur, based on the health score, different responsive actions may occur. Responsive actions may include sending an alert to a driver, sending an alert to an off-board system, including a PVC device or a depot device, sending an alert to another vehicle or vehicle system, generating a notification to an off-board facility to determine if a repair to the vehicle or change in a scheduled dispatch of the vehicle should occur, communicating the vibration characteristic, fluid characteristic, or temperature characteristic to an off-board system, changing axle torque applied to one or more of the axles to derate at least one of the axles and increase the axle torque applied to one or more others of the axles, stopping movement of the vehicle, slowing the movement on the vehicle, preventing a subsequent trip of the vehicle until repair, scheduling service of one or more components, or the like. The alert may include a visual message, auditory message, auditory sound, flashing lights, or the like. The notification may include an electronic message (email), text message, automated voice message, etc. In particular, based on the health score, responsive actions may be undertaken to prevent a locked axle before the locked axle occurs.

Figure 8:
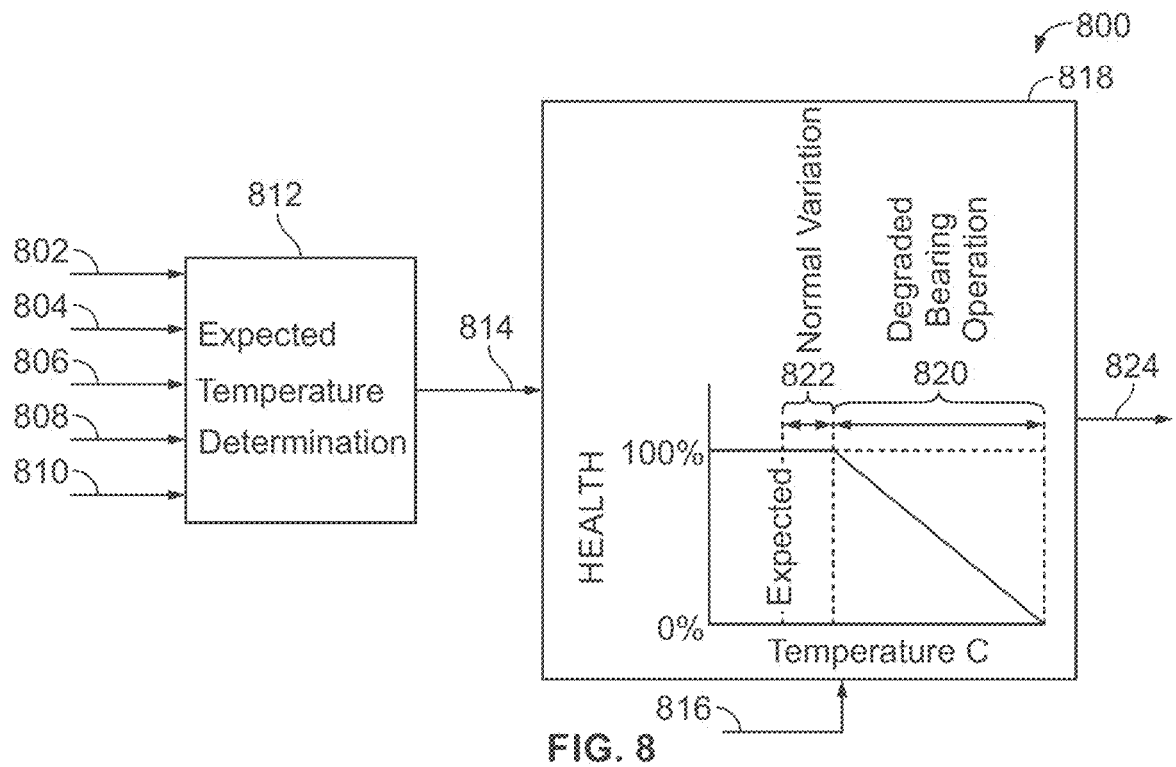
FIG. 8 illustrates a schematic block diagram of an algorithm.

FIG. 8 is an illustrative example algorithm 800 utilized for implementation of the method of FIG. 7. In this example, a health score is determined based on characteristics related to the vehicle system related to the health of a bearing of an axle. More specifically, the determination is based on operation of the vehicle system.

A first characteristic 802, second characteristic 804, third characteristic 806, fourth characteristic 808, and fifth characteristic 810 are utilized in making an expected temperature determination 812 of a bearing. The bearing may be a PE bearing, CE bearing, or the like. In one example, the first characteristic is the rotational speed of the axle, the second characteristic is an axle torque, the third characteristics ambient temperature of a surrounding environment of the bearing, the fourth characteristic is a track characteristic such as grade, curvature, etc., and the fifth characteristic is a vehicle characteristic such has material of bearing elements, size of the axle, etc. Each of the characteristics are temperature characteristics because they may be utilized to determine an expected temperature of a bearing. Specifically, each may be utilized to calculate friction and other temperature-based characteristics. The characteristics 802-810 may be received from sensors, vehicle characterization elements, trip characterization elements, off-board devices, trip plans, an off-board PTC controller, or the like. The expected temperature determination may be made based on mathematic calculations, models, functions, or the like.

After the expected temperature determination, the expected temperature 814 and a measured temperature 816 are both provided to a health determination algorithm 818. The health determination algorithm utilizes both the expected temperature and measured temperature to make determination related to the degradation 820 of the bearing as a result of operation. In this example, a tolerance 822 is provided for typical variation between such measurements. A bearing health score 824 is then provided based on the expected temperature compared to the measured temperature. Depending on the health score, responsive actions may be undertaken, including providing alerts, notifying a driver or third party, scheduling a maintenance appointment, reducing axel torque of the bearing, stopping the vehicle system, reducing the vehicle speed of the vehicle system, or the like. In this manner, the bearing health score is utilized to mitigate risk associated with a locked axle.

Figure 9:
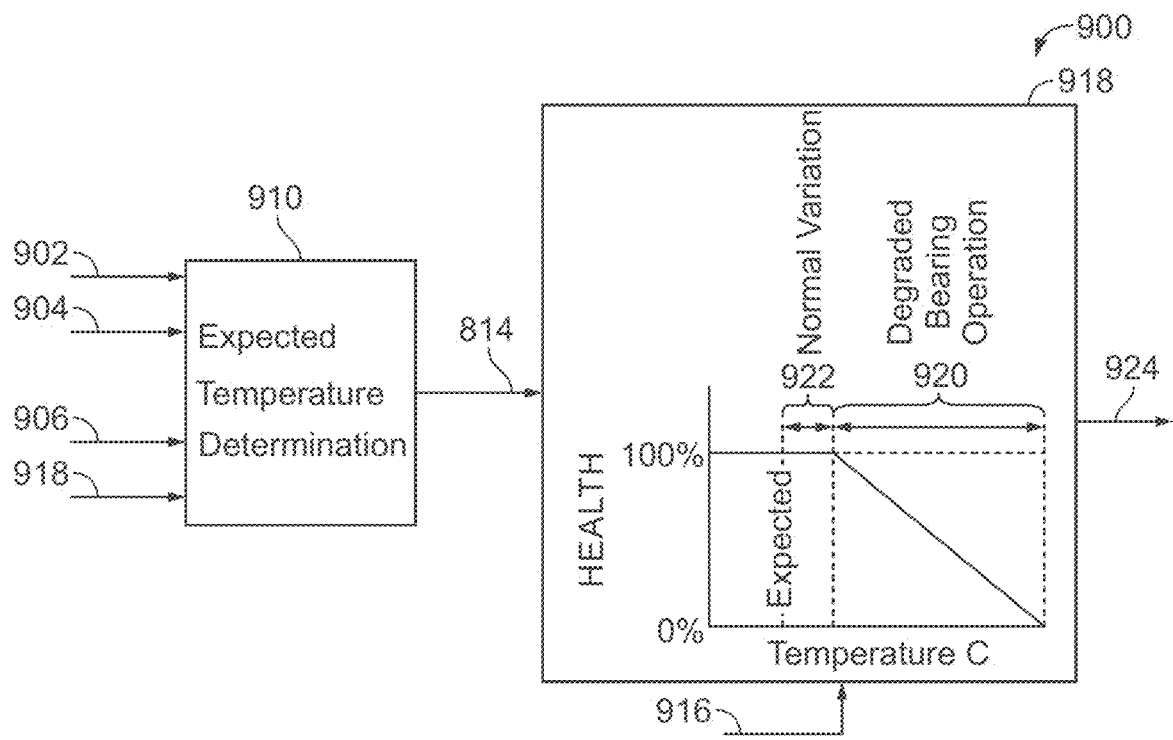
FIG. 9 illustrates a schematic block diagram of an algorithm.

FIG. 9 illustrates yet another example algorithm 900 utilized for implementation of the method of FIG. 7. In this example, a health score of an axle is determined based on a comparison to another axle. In particular, each axle of a vehicle system should provide characteristics that are relatively the same as the other axles. As a result, when one axle operates or performs significantly worse than another axle, an indication of a potential for a locked axle is provided. In addition, where the sensors are coupled to axles, vibration signals common to multiple axles may indicate poor track surface conditions. This information can be used to drive infrastructure work scopes or operational speed restrictions.

When determining the health of each axle, in the example algorithm of FIG. 9 a first characteristic 902 and a second characteristic 904 are related to a first axle, while a third characteristic 906 and fourth characteristic 908 related to another axle, or second axle. Each of the characteristics is input for an expected temperature determination 910 of a bearing. The bearing may be a PE bearing, CE bearing, or the like. For example, the first characteristic may be an axle bearing temperature of the first axle while the second characteristic is a duty characteristic, such as an axle torque requirement of the first axle. The third characteristic may be the axle bearing temperature of the second axle, while the fourth characteristic may be the axle torque requirement on the second axle. Based on these inputs, a determination may be made related to the expected temperature.

Similar to the embodiment of FIG. 8, after the expected temperature determination, the expected temperature 914, and a measured temperature 916 are both provided to a health determination algorithm 918. The health determination algorithm utilizes both the expected temperature and measured temperature to make determination related to the degradation 920 of the bearing as a result of operation. In this example, a tolerance 922 is provided for typical variation between such measurements. A bearing health score 924 is then provided based on the expected temperature compared to the measured temperature. Depending on the health score, responsive actions may be undertaken, including providing alerts, notifying a driver or third party, scheduling a maintenance appointment, reducing axle torque on an axle with the bearing having a poor health score, stopping the vehicle system, reducing the vehicle speed of the vehicle system, or the like.

Figure 10:
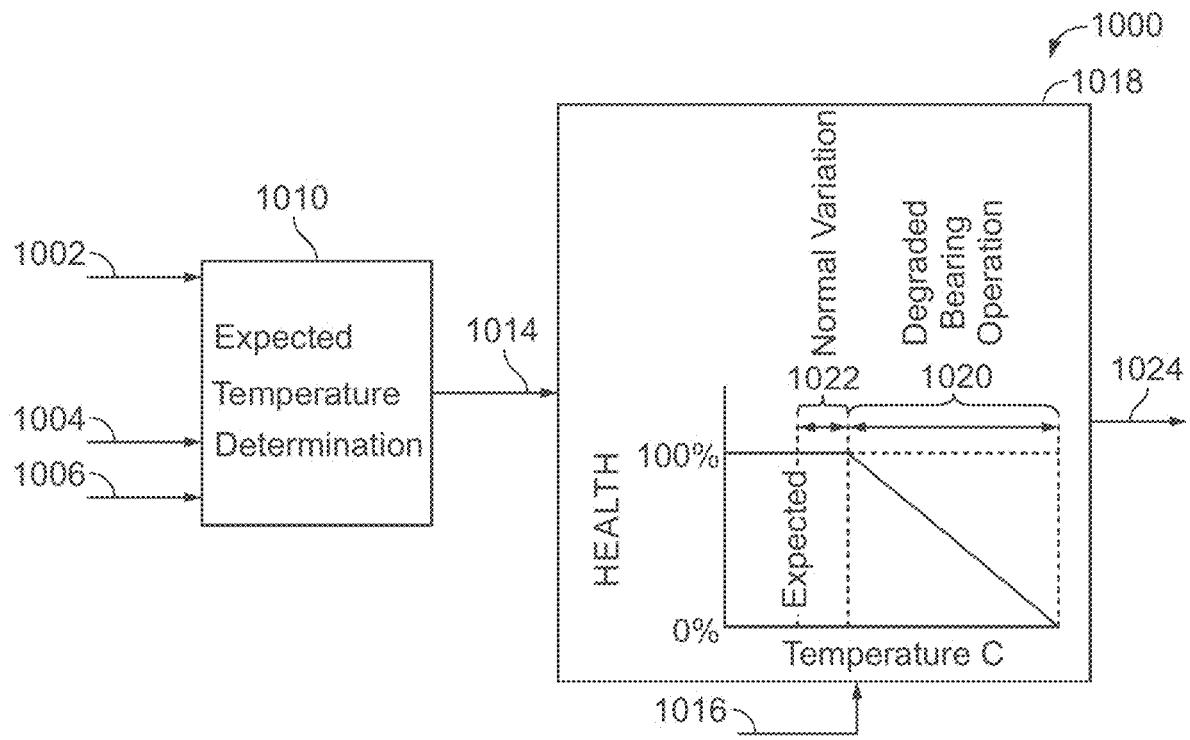
FIG. 10 illustrates a schematic block diagram of an algorithm.

FIG. 10 illustrates yet another example algorithm 1000 utilized for implementation of the method of FIG. 7. In this example, a health score of an axle is determined based on sensors within a drive train. In particular, by utilizing vibration characteristics, fluid characteristics, and/or temperature characteristics related to the drive train, an expected temperature may be determined.

In the example algorithm of FIG. 10 a first characteristic 1002 may be related to a bearing structure, such as an axle bearing temperature. Meanwhile, a second characteristic 1004 and a third characteristic 1006 may be related to the drive train. In one example, the second characteristic is engine oil temperature, and the third characteristic is motor temperature. Each of the characteristics is input for an expected temperature determination 1010 of a bearing. The bearing may be a PE bearing, CE bearing, or the like. As with the embodiments of FIGS. 8-9, the expected temperature determination may be made utilizing a mathematical function, mathematical model, a computer-generated mode, a look up table, decision tree, or the like. In yet another example, an additional drive train characteristic may be utilized. In such an embodiment, the three-drive train related characteristics may be compared to determine if one of the measured characteristics is providing a fault in the measurement. Thus, by utilizing comparisons, one or more responsive actions that is implemented may be restricted based on the comparison to rule out a false positive detection of a fault with the vehicle.

Similar to the embodiments of FIGS. 8-9, after the expected temperature determination, the expected temperature 1014, and a measured temperature 1016 are both provided to a health determination algorithm 1018. The health determination algorithm utilizes both the expected temperature and measured temperature to make determinations related to the degradation 1020 of the bearing as a result of operation. In this example, a tolerance 1022 is provided for typical variation between such measurements. A bearing health score 1024 is then provided based on the expected temperature compared to the measured temperature. Depending on the health score, responsive actions may be undertaken, including providing alerts, notifying a driver or third party, scheduling a maintenance appointment, reducing axle torque on the axle with the bearing with a poor health score, stopping the vehicle system, reducing the vehicle power or speed of the vehicle system, or the like.

Figure 11:
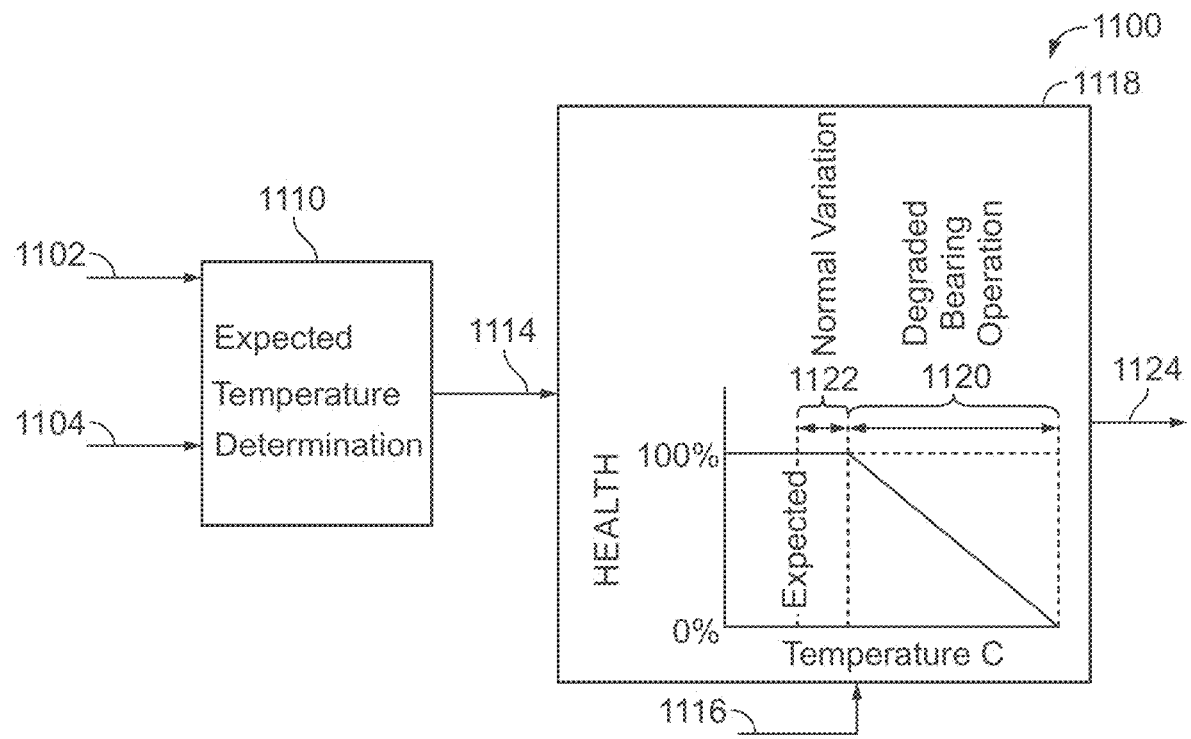
FIG. 11 illustrates a schematic block diagram of an algorithm.

FIG. 11 illustrates yet another example algorithm 1100 utilized for implementation of the method of FIG. 7. In this example, a health score of an axle is determined based on a comparison of delta temperature versus delta expected. In particular, by utilizing vibration characteristics, fluid characteristics, and/or temperature characteristics related to the drive train, an expected temperature may be determined.

In the example algorithm of FIG. 11 a first characteristic 1102 may be related to a temperature of a PE bearing, while the second characteristic 1104 is related to a temperature of a CE bearing. Each of the characteristics is input for an expected temperature determination 1010 of a bearing. The bearing in this example embodiment is a PE bearing. As with the embodiments of FIGS. 8-10, the expected temperature determination may be made utilizing a mathematical function, mathematical model, a computer-generated mode, a look up table, decision tree, or the like.

Similar to the embodiments of FIGS. 8-10, after the expected temperature determination, the expected temperature 1114, and a measured temperature 1116 are both provided to a health determination algorithm 1118. The health determination algorithm utilizes both the expected temperature and measured temperature to make determination related to the degradation 1120 of the bearing as a result of operation. In this example, a tolerance 1122 is provided for typical variation between such measurements. A bearing health score 1124 is then provided based on the expected temperature compared to the measured temperature. Depending on the health score, responsive actions may be undertaken, including providing alerts, notifying a driver or third party, scheduling a maintenance appointment, reducing axle torque on the axle with the bearing having a poor health score, stopping the vehicle system, reducing the vehicle speed of the vehicle system, or the like.

FIGS. 8-11 all demonstrate example embodiments where the expected temperature of an axle bearing is determined and compared to a measured temperature of an axle bearing to determine a health score of the axle bearing. In addition, utilizing similar methodology the health score of other characteristics may be determined and utilized to determine a health score of an axle that may then be utilized to take actions mitigate for a potential locked axle.

Figure 12:
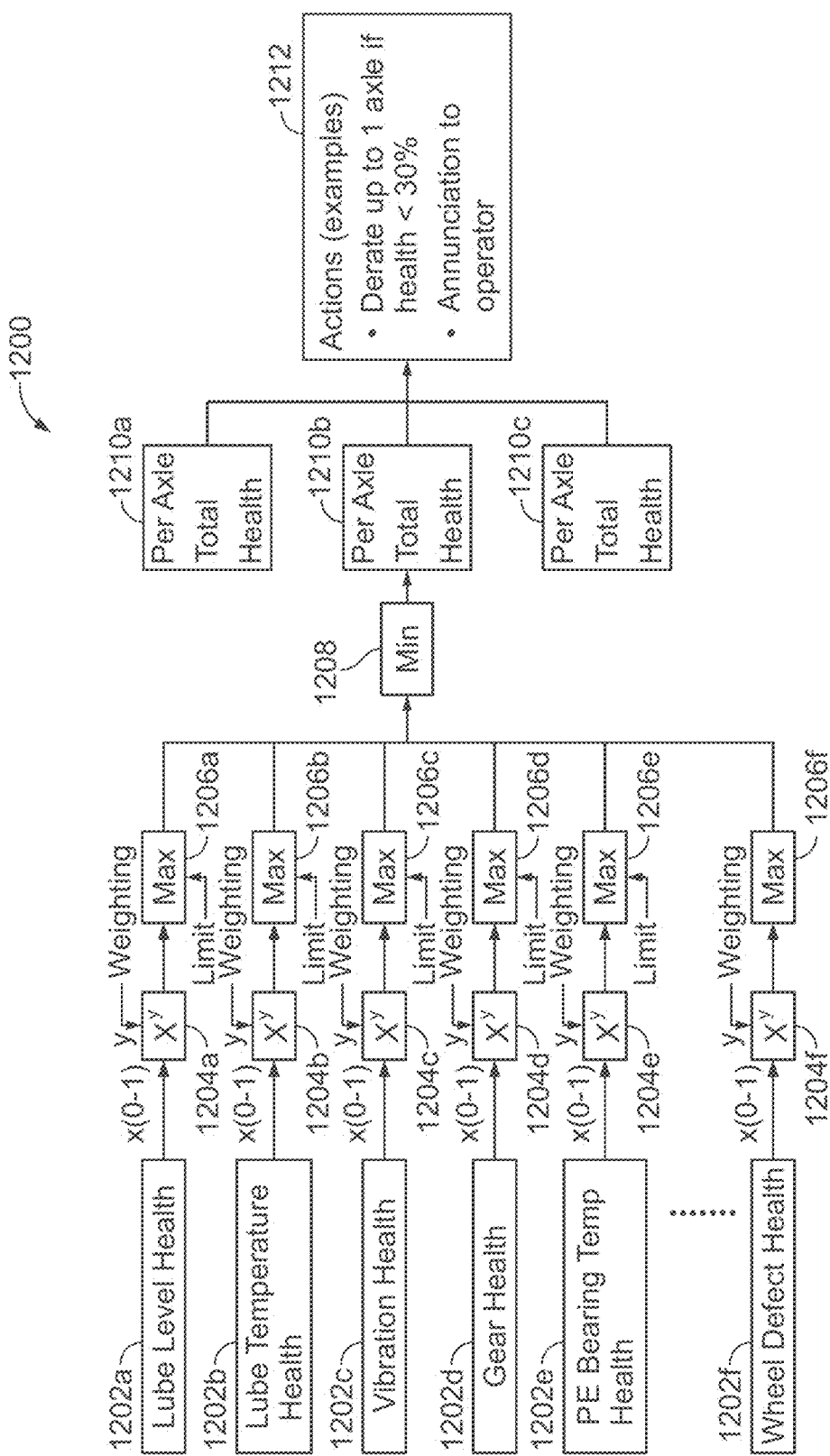
FIG. 12 illustrates a schematic block diagram of a deration algorithm.

FIG. 12 illustrates a deration algorithm 1200 provided for mitigating for a potential locked axle. As illustrated, first, second, third, fourth, fifth, and sixth health scores 1202A-F are illustrated. While in this embodiment six health scores are utilized, in other embodiments, only one health score may be utilized. Alternatively, more than six health scores are utilized. In particular, one or more health scores may be utilized, where the more health scores utilized provide more accurate results. For the embodiment of FIG. 12, in one example, the first health score is lubricant level of the gear case health score, the second health score is a lubricant temperature of the gear case health score, the third health score is a vibration of the gear case health score, the fourth health score is a gear health score, the fifth health score is a PE temperature health score, and the sixth health score is a wheel defect health score. In example embodiments, the PE temperature health score is determined utilizing an algorithm of FIGS. 8-11. As shown, by using vibration characteristics, fluid characteristics, and/or temperature characteristics, numerous health scores may be determined to improve accuracy of determining the health of an axle.

For each health score a weight 1204A-F is provided. The weight may be determined based on the health score. In one example, the worse a health score is, the more weight that is provided for that health score. In this manner, if the wheel defect score is such that a locked axle is expected with the next 50 miles of travel, and all of the other scores indicate that a locked axle is not expected until another 10,000+ hours, significantly more weight is provided to the wheel defect score to ensure an accurate result is presented.

Alternatively, the weight may depend on the accuracy of a health score. In one embodiment, the health scores are on a scale of 1 to 100. In an example of such an embodiment, 95% of the time when the health score based on a lubrication oil temperature is below 20 a locked axle occurs within the next one hundred miles of travel, whereas only 50% of the time when the health score based on bearing vibration is below 20 does a locked axle occur. Specifically, in such an embodiment, the type of vibration sensor measuring the bearings may not be as accurate as the lubrication oil temperature system. As a result, more weight is provided to a health score based on a lubrication oil temperature below 20 than the health score based on bearing vibration being below 20. Alternatively, in other examples the weight may be calculated utilizing a mathematical model, function, look up table, decision tree, or the like.

Based on the weight, a maximum score 1206A-F is provided. The maximum score may be determined in any of the manners for making determinations previously discussed. Then based on maximum scores, a minimum score 1208 may be determined for each axle to provide an axle health score 1210A-C for each axle. From the axle health score 1210A-C for each axle, a responsive action 1212 may be taken to prevent a locked axle occurring during a trip. For example, based on the axle health score for each axle, a minimum period before a predicted failure, or high probability of failure may be provided. A high probability of failure may include a probability above 50% that a locked axle will occur over the period. Alternatively, the high probability of failure may include a probability above 20% that a locked axle will occur during a minimum period. The minimum period may be provided in terms of time, distance, or the like. In one example, the minimum period may be 3 hours at the current vehicle speed, 10 trips of more than 500 miles, 300 miles, etc.

In this manner, information is provided that may be utilized in taking responsive actions to prevent a locked axle from occurring during a trip. Such responsive actions may include derating an identified axle to reduce axle torque on the identified axle while increasing axle torque of healthier axles, decreasing vehicle speed of the vehicle system, preventing the vehicle system from leaving a station or depot after stop until repair occurs, scheduling a repair, skipping a pre-planned stop in favor of a stop not previously planned where maintenance can occur, alerting a third party device of the health score of the axle, altering a driver of the health score of the axle, or the like.

Figure 13:
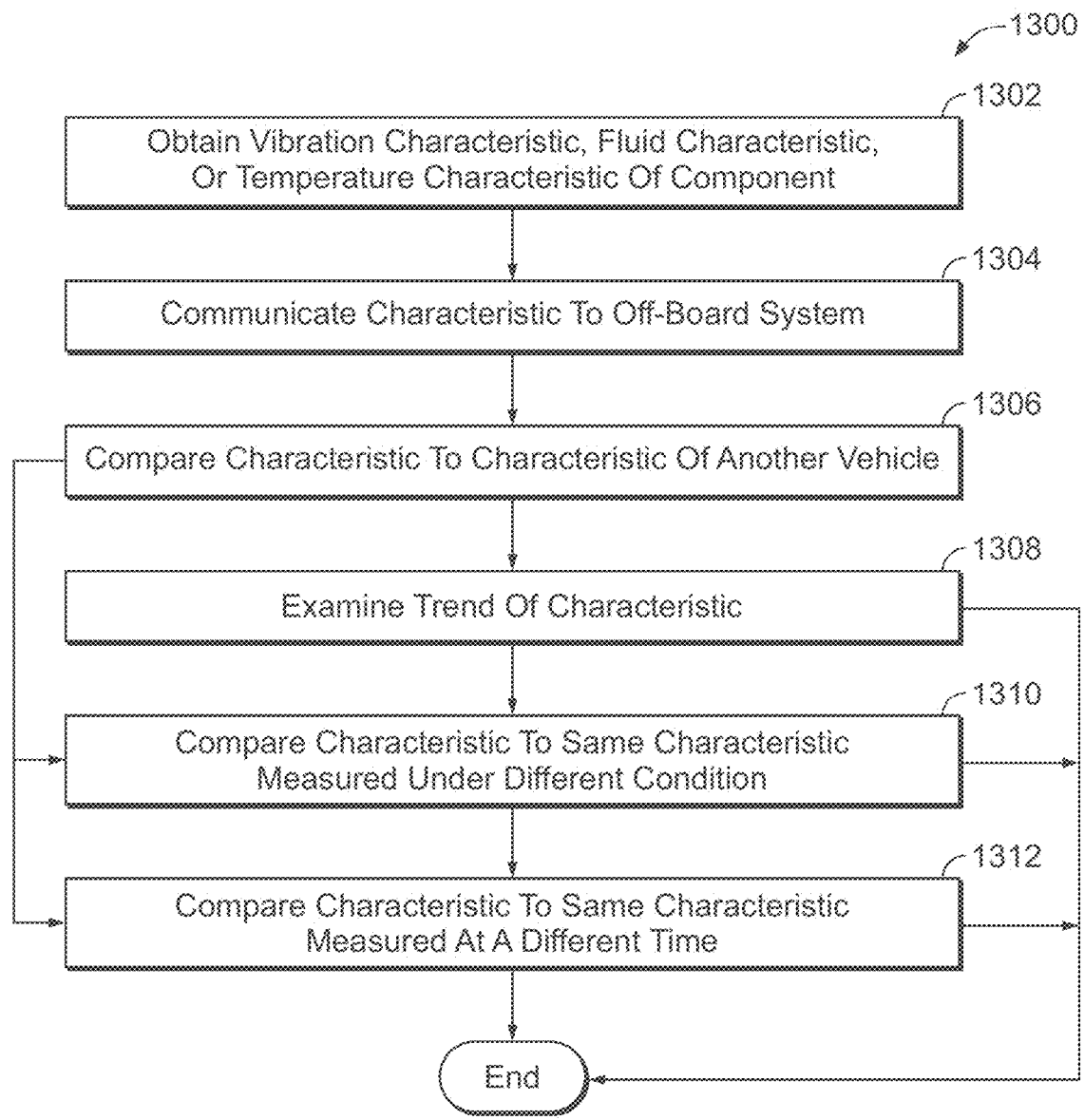
FIG. 13 illustrates a flow block diagram of a method of determining a likelihood of drive train failure of a vehicle.

FIG. 13 illustrates an example embodiment of a flow block diagram of a method 1300 for detection of a drive train failure of a rail vehicle. In one example, the vehicle system is the vehicle system of FIG. 1. In another example, the method is implemented by the controller of FIG. 2. In one embodiment the vehicle system is a rail vehicle system. In other embodiments, the vehicle system is one of off-road vehicle(s), trolley(s), a fleet of aircraft, a fleet of marine vessels, or the like.

At step 1302, one or more of a vibration characteristic, a fluid characteristic, or temperature characteristic of one or more components of a vehicle are obtained. In an example, the characteristics may be obtained by sensors, an on-board controller, a trip plan, etc. In one example the vehicle is part of a vehicle system. The vibration characteristic may be any reading, data, information, signal, current, slip, capacitance, etc. related or associated with vibration. The reading, data, information, signal, current, slip, capacitance, etc. may be related or associated with vibration if it provides the vibration of any component of the vehicle or may be utilized to obtain the vibration of any component of the vehicle. The vibration characteristic may be provided by the reading, data, information, signal, current, slip, capacitance, etc. The vibration characteristic may be obtained utilizing an algorithm, mathematical equation, mathematic model, a function, look up table, decision tree, etc. In one example, the vibration characteristic is a vibration signature.

The temperature characteristic may be any reading, data, information, signal, current, slip, capacitance etc. related to or associated with temperature. The reading, data, information, signal, current, slip, capacitance, etc. may be related or associated with temperature if it provides the temperature of any component of the vehicle. The temperature characteristic may be obtained utilizing an algorithm, mathematical equation, mathematic model, a function, look up table, decision tree, etc. In one example, the temperature characteristic is a temperature.

Similarly, the fluid characteristic may be any reading, data, information, signal, current, slip, capacitance, etc. related or associated with a fluid. The reading, data, information, signal, current, slip, capacitance, etc. may be related or associated with the fluid if it provides a characteristic of a fluid of the vehicle or may be utilized to obtain the characteristic a fluid of the vehicle. The fluid characteristic may be provided by the reading, data, information, signal, current, slip, capacitance, etc. The fluid characteristic may be obtained utilizing an algorithm, mathematical equation, mathematic model, a function, look up table, decision tree, etc. In one example, the fluid characteristic may be a fluid amount.

At step 1304, the vibration characteristic, fluid characteristic, or temperature characteristic are communicated to an off-board system. The off-board system may be a PTC, depot controller, maintenance controller, client controller, customer controller, etc. The off-board system may include additional historical information and data related to the vehicle system, the route of the vehicle system, route characteristics, other similar vehicle systems, other similar vehicle systems that have previously traveled the route, or the like. Based on the characteristics, a vibration characteristic, fluid characteristic, or temperature characteristic may be determined by the off-board system. The vibration characteristic determined may include one or more of a bearing vibration of one or more bearings of an axle of the vehicle, a gear vibration of one or more gears of the vehicle, a gear transmitted vibration generated by the one or more gears of the vehicle, an air transmitted vibration, a structure transmitted vibration, a case vibration of a gear case of the vehicle, an acceleration of one or more wheels of the vehicle, or the like. The temperature characteristic determined may include one or more of a fluid temperature, lubricant temperature, axle bearing temperature including PE bearing temperature and CE bearing temperature, including of bearing elements, races, tubes, or the like, winding temperature, etc. In example embodiment, a characteristic may be two or more of a vibration characteristic, fluid characteristic, and temperature characteristic. For example, the temperature of fluid such as oil within a gear case may be both a fluid characteristic and a temperature characteristic. The fluid characteristic determined may include one or more of an axle bearing temperature of one or more bearings of an axle of the vehicle, a motor bearing temperature of one or more traction motor bearings, a combination axle bearing temperature of one or more combination bearings, a journal bearing temperature of one or more journal bearings, a fluid temperature of a lubricant in one or more of a gear case or an engine of the vehicle, a winding temperature of one or more conductive windings of a motor in the vehicle, lubricant or fluid levels, or the like.

At step 1306, the vibration characteristic, fluid characteristic, or temperature characteristic are determined by comparing the characteristic of the vehicle with a similar characteristic measured for another vehicle. In an example, if vibration characteristics include the axle size, vehicle size, vehicle weight, vehicle speed, tract terrain, wheel wear, etc. The characteristic may also include a characteristic of a vehicle having the same axle size, moving at the same speed over the same route terrain found in a database of the off-board controller. The measured vibration characteristic from the other vehicle may be compared to the measured vibration of the vehicle.

At step 1308, optionally, the vibration characteristic, fluid characteristic, or temperature characteristic are determined by examining trends in the vibration characteristic, fluid characteristic, or temperature characteristic. Specifically, trends for a vibration characteristic may be reviewing the vibration characteristic at a similar vehicle speeds at numerous points during the trip to determine if the vibration characteristic is steadily increasing, remaining the same, decreasing, variable, etc.

At step 1310, optionally, the vibration characteristic, fluid characteristic, or temperature characteristic are determined by comparing the characteristic measured under a first condition with the characteristic measured under a different, second condition. In one example, a vibration characteristic is measured when the vehicle system is traveling at a first vehicle speed, such as 40 mph, and then measured when the vehicle system is traveling at a faster second vehicle speed, such as 60 mph.

At step 1312, optionally, the vibration characteristic, fluid characteristic, or temperature characteristic are determined by comparing the characteristic measured for the vehicle at a first age of the vehicle with a characteristic measured for the vehicle at a later second age of the vehicle. So, in an example, a vibration characteristic of a vehicle system may be determined when traveling at a certain part of the route when the vehicle system is 10 years old, and the same train made the same trip on the same route when the train was 3 years old. The vibration characteristic of the vehicle system when the vehicle system was 3 years old is then compared to the vehicle system when the vehicle system is 10 years old.

In one or more embodiments, a method is provided that may include determining one or more of a vibration characteristic or a fluid characteristic of one or more components of a vehicle and determining one or more expected characteristics for the one or more of the vibration characteristic or the fluid characteristic. The method may also include determining whether the one or more of the vibration characteristic or the fluid characteristic deviates from the one or more expected respective characteristics, and implementing one or more responsive actions in response to determining that the one or more of the vibration characteristic or the fluid characteristic deviates from the one or more expected characteristics.

Optionally, the fluid characteristic may be determined as one or more of a bearing temperature of one or more bearings of an axle of the vehicle, a motor bearing Temperature is measured as a bearing temperature, oil temperature, or motor winding temperature of one or more traction motor bearings, a combination bearing temperature of one or more combination bearings, a journal bearing temperature of one or more journal bearings, a fluid temperature of a lubricant in one or more of a gear case or an engine of the vehicle, or a winding temperature of one or more conductive windings of a motor in the vehicle. In one aspect, the one or more expected temperature characteristics that may be determined may include an expected temperature difference between bearings of different axles. In another aspect, the one or more expected temperature characteristics that is determined may include an expected motor temperature of a motor that rotates at least one axle.

Optionally, the vehicle may include plural axles, the one or more of the vibration characteristic or the fluid characteristic is determined for a first axle of the axles, and the one or more expected vibration characteristic, fluid characteristic, or temperature characteristic are determined based at least in part on operation of a set of the axles that does not include the first axle. In one aspect, the one or more expected vibration and fluid characteristics that are determined may be an expected axle temperature that is based at least in part on torques and temperatures of each of the axles in the set. In one example, the axles may be in the same vehicle in a multi-vehicle system. In another example, the axles may be in different vehicles in a multi-vehicle system.

Optionally, the vibration characteristic may be determined and includes one or more of a bearing vibration of one or more bearings of an axle of the vehicle, a gear vibration of one or more gears of the vehicle, a gear transmitted vibration generated by the one or more gears of the vehicle, an air transmitted vibration, a structure transmitted vibration, a case vibration of a gear case of the vehicle, or an acceleration of one or more wheels of the vehicle. In one aspect, the fluid characteristic may be a lubrication amount and includes an amount of oil in one or more of an engine, a gear case, or a drive train enclosure in the vehicle. In one embodiment, the one or more expected characteristics may be at least partially on an ambient condition. In one example of the embodiment, the ambient condition may include one or more of a rotational speed of one or more wheels of the vehicle, an ambient temperature, an ambient sound, a route characteristic of a route on which the vehicle is moving, a vehicle characteristic of the vehicle, a torque applied to one or more axles of the vehicle one or more of a health of the route, a presence of one or more gaps in the route, a curvature of the route, a position of the vehicle on the route, or a misalignment in the route as the route characteristic, a weight of the vehicle, a moving speed of the vehicle, a size of a wheel of the vehicle, or an estimated dynamic axle weight as the vehicle characteristic.

Optionally, the one or more expected characteristics for the one or more of the vibration characteristic or the fluid lubrication amount also may be based on operation of the vehicle. In one aspect, the one or more expected characteristics may be based on the operation of the vehicle that includes one or more of a moving speed of the vehicle, a torque exerted on an axle of the vehicle, an ambient temperature, one or more characteristics of a route on which the vehicle is moving, or one or more characteristics of the vehicle. In one embodiment, the one or more responsive actions that are implemented may include generating a notification to an off-board facility that determines whether to repair the vehicle or change a scheduled dispatch of the vehicle based on deviation of the one or more of the vibration characteristic or the lubrication characteristic from the one or more expected characteristics.

Optionally, the method may also include communicating the vibration characteristic to an off-board system that one or more of compares the vibration characteristic of the vehicle with a vibration characteristic measured for another vehicle, or examines trends in the vibration characteristic. the method may also include communicating the vibration characteristic to an off-board system that one or more of compares the vibration characteristic measured under a first condition with the vibration characteristic measured under a different, second condition, or compares the vibration characteristic measured for the vehicle at a first age of the vehicle with the vibration characteristic measured for the vehicle at a later second age of the vehicle. In one aspect, the one or more responsive actions that may be implemented include de-rating a first axle of the vehicle while one or more other axles of the vehicle continue to be rotated by one or more of a motor or engine of the vehicle to propel the vehicle.

Optionally, the method also includes determining health scores for each of plural axles of the vehicle based on deviation between the one or more of the vibration characteristic or the lubrication characteristic and the one or more expected characteristics. In one aspect, the one or more responsive actions that may be implemented include one or more of changing torque applied to one or more of the axles to derate at least one of the axles and increase the torque applied to one or more others of the axles based on the health scores or selecting stopping movement of the vehicle. The one or more responsive actions that may also be implemented may include one or more of slowing the movement of the vehicle, completing a current trip of the vehicle, and preventing a subsequent trip of the vehicle until the vehicle is repaired, or scheduling service of the one or more components of the vehicle at a subsequent, previously scheduled maintenance of the vehicle. In another aspect, the one or more responsive actions that are implemented may be selected based on different impacts of the one or more responsive actions to a likelihood of completing a trip. In one example, the one or more responsive actions that are implemented may include preventing changing the torque applied to the one or more of the axles responsive to determining that the vehicle will stall on a grade when the torque would be changed.

In one or more embodiments, a method is provided that may include determining one or more of a temperature, a vibration signature, or a fluid lubricant amount for a first axle of a vehicle, and determining the one or more of the temperature, the vibration signature, or the fluid lubricant amount for at least a second axle of the vehicle. The method may also include comparing the one or more of the temperature, the vibration signature, or the fluid lubricant amount that is determined for the first axle with the one or more of the temperature, the vibration, or the fluid lubricant amount that is determined for the at least the second axle, and determining a health of the first axle based on comparing the one or more of the temperature, the vibration signature, or the fluid lubricant amount that is determined for the first axle with the one or more of the temperature, the vibration signature, or the fluid lubricant amount that is determined for the at least the second axle.

Optionally, the vibration characteristic may be determined by multiple sensors coupled with different axles of the vehicle, and the method may also include comparing vibrations measured by the sensors coupled with the different axles. The method may also include to identify a damaged portion of a route based on the vibrations that are measured by the sensors coupled with the different axles and compared with each other. In another aspect, the one or more of the vibration characteristic or the fluid lubrication amount may be determined by direct measurement. In one example, the one or more of the vibration characteristic or the fluid lubrication amount are determined by indirect measurement. In another example, the one or more of the vibration characteristic or the fluid lubrication amount are determined from a measurement of another, different characteristic. In another aspect, the other, different characteristic includes one or more of wheel slip, electric current conducted within the vehicle, or a capacitance measured within the vehicle. In one embodiment, the vibration characteristic is determined and includes one or more of a frequency or amplitude of a vibration.

Optionally, the method may also include determining a comparison between the one or more of the vibration characteristic or the fluid lubrication amount that is determined for the vehicle. The method may also include determining a comparison between one or more of a vibration characteristic or a fluid lubrication amount that is measured for the vehicle under a different condition or that is measured for another vehicle. The method may also include restricting which of the one or more responsive actions that is implemented based on the comparison to rule out a false positive detection of a fault with the vehicle.

In one or more embodiments, a system is provided that include one or more sensors that may measure one or more of a vibration characteristic or a fluid lubrication amount of one or more components of a vehicle. The system can also include one or more processors that may determine one or more expected characteristics for the one or more of the vibration characteristic or the fluid lubrication amount. The one or more expected characteristics may be at least partially based on an ambient condition. The one or more processors may also determine whether the one or more of the vibration characteristic or the lubrication characteristic deviates from the one or more expected characteristics. The one or more processors may also implement one or more responsive actions in response to determining that the one or more of the vibration characteristic or the lubrication characteristic deviates from the one or more expected characteristics.

In one or more embodiments, a method is provided that may include determining one or more of a vibration characteristic or a fluid lubrication amount of one or more components of a vehicle. The method may also include determining one or more expected characteristics for the one or more of the vibration characteristic or the fluid lubrication amount. The one or more expected characteristics may at least partially be based on an ambient condition. The method may also include determining whether the one or more of the vibration characteristic or the lubrication characteristic deviates from the one or more expected characteristics, and determining health scores for each of plural axles of the vehicle based on deviation between the one or more of the vibration characteristic or the lubrication characteristic and the one or more expected characteristics. The method may also include selecting stopping movement of the vehicle, slowing the movement of the vehicle, completing a current trip of the vehicle, and preventing a subsequent trip of the vehicle until the vehicle is repaired, or scheduling service of the one or more components of the vehicle at a subsequent, previously scheduled maintenance of the vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the control system may have a local data collection system deployed that may use machine learning to enable derivation-based learning outcomes. The control system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The maintenance system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    determining at least one first characteristic of a first axle of a vehicle, the at least one first characteristic comprising one or more of a first temperature, a first vibration signature, or a first fluid lubricant amount for the first axle;
    determining a first probability that the first axle will lock during future operation of the vehicle based at least in part on the at least one first characteristic;

determining at least one second characteristic of a second axle of the vehicle, the at least one second characteristic being different than the at least one first characteristic and comprising one or more of a second temperature, a second vibration signature, or a second fluid lubricant amount for the second axle;

determining a second probability that the second axle will lock during the future operation of the vehicle based on the at least one second characteristic;

comparing the at least one first characteristic with the at least one second characteristic;

combining the first probability that the first axle will lock with the second probability that the second axle will lock during the future operation of the vehicle to determine a health of the vehicle; and implementing one or more responsive actions in response to determining the health of the vehicle, wherein the one or more responsive actions include one or more of:

changing torque applied to the first axle to derate the first axle, stopping movement of the vehicle, slowing the movement of the vehicle, completing a current trip of the vehicle, and preventing a subsequent trip of the vehicle until the vehicle is repaired, or scheduling service of one or more components of the vehicle at a subsequent, previously scheduled maintenance of the vehicle.

2. The method of claim 1, wherein the first vibration signature and the second vibration signature are determined by sensors coupled with the first axle and the second axle of the vehicle, and further comprising:

comparing vibrations measured by the sensors coupled with the first axle and the second axle; and identifying a damaged portion of a route based on the vibrations that are measured by the sensors coupled with the first axle and the second axle and compared with each other.

3. The method of claim 1, wherein the one or more of the first vibration signature, the second vibration signature, the first fluid lubrication amount of the first axle, and the second fluid lubrication amount of the second axle are determined by direct measurement.

4. The method of claim 1, wherein the one or more of the first vibration signature, the second vibration signature, the first fluid lubrication amount of the first axle, and the second fluid lubrication amount of the second axle are determined from a measurement of another, different characteristic; and wherein the different characteristic includes one or more of a wheel slip, an electric current conducted within the vehicle, or a capacitance measured within the vehicle.

5. The method of claim 1, further comprising:

determining a difference between the at least one first characteristic of the first axle of the vehicle and the at least one second characteristic of the second axle of the vehicle;

implementing the one or more responsive actions in response to determining the difference between the first characteristic and the second characteristic; and selecting the one or more responsive actions to be implemented based on the difference between the at least one first characteristic and the at least one second characteristic.

\* \* \* \* \*